United States Patent
Rice

(10) Patent No.: US 9,585,407 B1
(45) Date of Patent: Mar. 7, 2017

(54) FISH CLEANING STATION

(71) Applicant: Brooks T. Rice, Fayetteville, AR (US)

(72) Inventor: Brooks T. Rice, Fayetteville, AR (US)

(73) Assignee: Brooks T. Rice, Fayetteville, AR (US)

( * ) Notice: Subject to any disclaimer, the term of this patent is extended or adjusted under 35 U.S.C. 154(b) by 0 days.

(21) Appl. No.: 15/287,463

(22) Filed: Oct. 6, 2016

(51) Int. Cl.
  *A22C 25/00* (2006.01)
  *A22C 25/06* (2006.01)
  *A22C 25/02* (2006.01)

(52) U.S. Cl.
  CPC ............ *A22C 25/06* (2013.01); *A22C 25/025* (2013.01)

(58) Field of Classification Search
  CPC ........ A01K 99/00; A01K 97/00; A01K 97/04; A01K 97/05; A22C 25/06; A22C 25/006; A22C 25/00; A22C 25/14; A22C 25/145; A22C 25/127; A22C 25/18; A22C 25/185
  USPC ........................... 452/173; 43/4, 54.1, 55–57
  See application file for complete search history.

(56) References Cited

U.S. PATENT DOCUMENTS

| | | | |
|---|---|---|---|
| 2,677,363 A * | 5/1954 | Bryan | A01K 97/01 126/25 R |
| 3,170,458 A * | 2/1965 | Anderlie | F24C 1/16 126/271.3 |
| 3,561,043 A | 2/1971 | Breckenridge | |
| 3,590,423 A | 7/1971 | Messer | |
| 4,229,858 A | 10/1980 | Baxter | |
| 4,766,621 A | 8/1988 | Rasor | |
| 4,935,991 A | 6/1990 | Tourney | |
| 5,098,338 A | 3/1992 | Jensen | |
| 5,106,002 A | 4/1992 | Smith | |
| 5,313,676 A | 5/1994 | Wright | |
| 5,474,494 A | 12/1995 | Sims | |
| 5,542,359 A | 8/1996 | Polries | |
| 5,860,367 A | 1/1999 | Riegel | |
| 5,881,404 A | 3/1999 | Knight | |
| 6,189,458 B1 | 2/2001 | Rivera | |
| 6,200,212 B1 | 3/2001 | Henry | |
| D445,395 S | 7/2001 | Okerlund | |
| 6,254,473 B1 | 7/2001 | Shore | |
| 6,314,891 B1 | 11/2001 | Larson | |
| 6,427,259 B1 | 8/2002 | Cawthon | |
| 6,487,814 B1 * | 12/2002 | Arredondo | A01K 97/06 206/315.11 |
| 6,554,691 B1 | 4/2003 | Schauls | |
| 6,836,910 B2 | 1/2005 | Cawthon | |
| 7,040,977 B1 | 5/2006 | Kline | |
| 7,066,096 B1 | 6/2006 | Harker | |
| 7,207,132 B1 * | 4/2007 | Parsons | A01K 97/045 43/4 |
| 7,374,479 B2 | 5/2008 | Quinney | |
| 7,384,051 B1 * | 6/2008 | Haire | A01K 97/05 280/47.34 |
| 7,389,608 B1 * | 6/2008 | MacKay | A01K 97/05 206/315.11 |
| 7,390,249 B2 | 6/2008 | Sorey | |
| 8,806,803 B1 * | 8/2014 | Mitchell | A01K 97/05 206/315.11 |
| 2005/0009462 A1 | 1/2005 | Mickelson | |

(Continued)

*Primary Examiner* — Richard Price, Jr.
(74) *Attorney, Agent, or Firm* — Mark Murphey Henry

(57) ABSTRACT

Disclosed is a fish cleaning station. The cleaning station features a support frame with ample storage and workspace, a convenient waste holder, a supply of running water, electrical connections, and an overall design that is easy to clean and maintain.

4 Claims, 7 Drawing Sheets

(56) References Cited

U.S. PATENT DOCUMENTS

| | | | |
|---|---|---|---|
| 2005/0009463 A1* | 1/2005 | Grosseholz | A22C 25/08 452/179 |
| 2011/0239525 A1* | 10/2011 | Morales | A01K 97/06 43/54.1 |
| 2012/0064215 A1 | 3/2012 | Michaud | |
| 2012/0151820 A1* | 6/2012 | Carroll | A01K 97/06 43/54.1 |
| 2014/0068998 A1* | 3/2014 | Peak | A01K 97/06 43/55 |

* cited by examiner

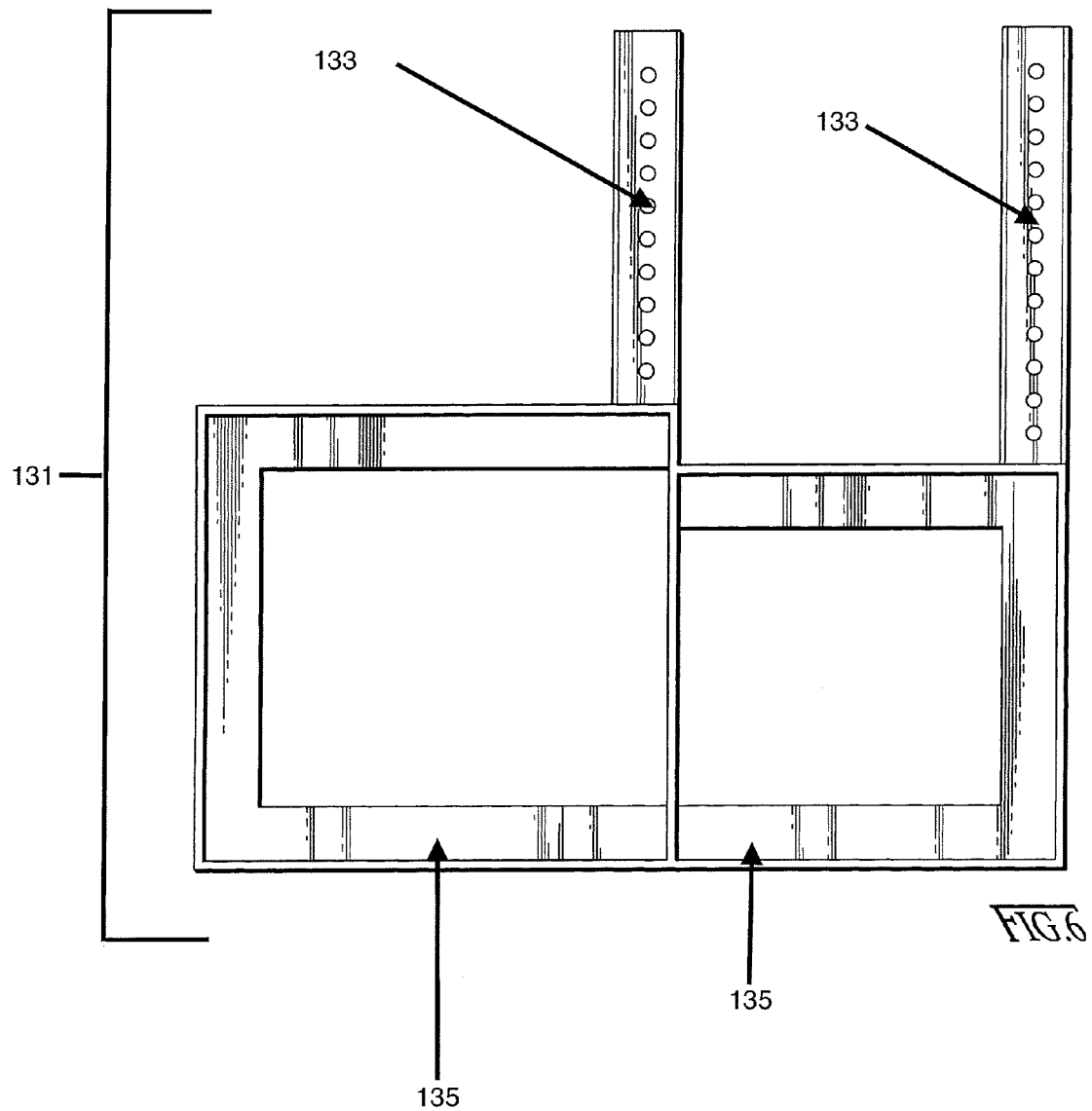

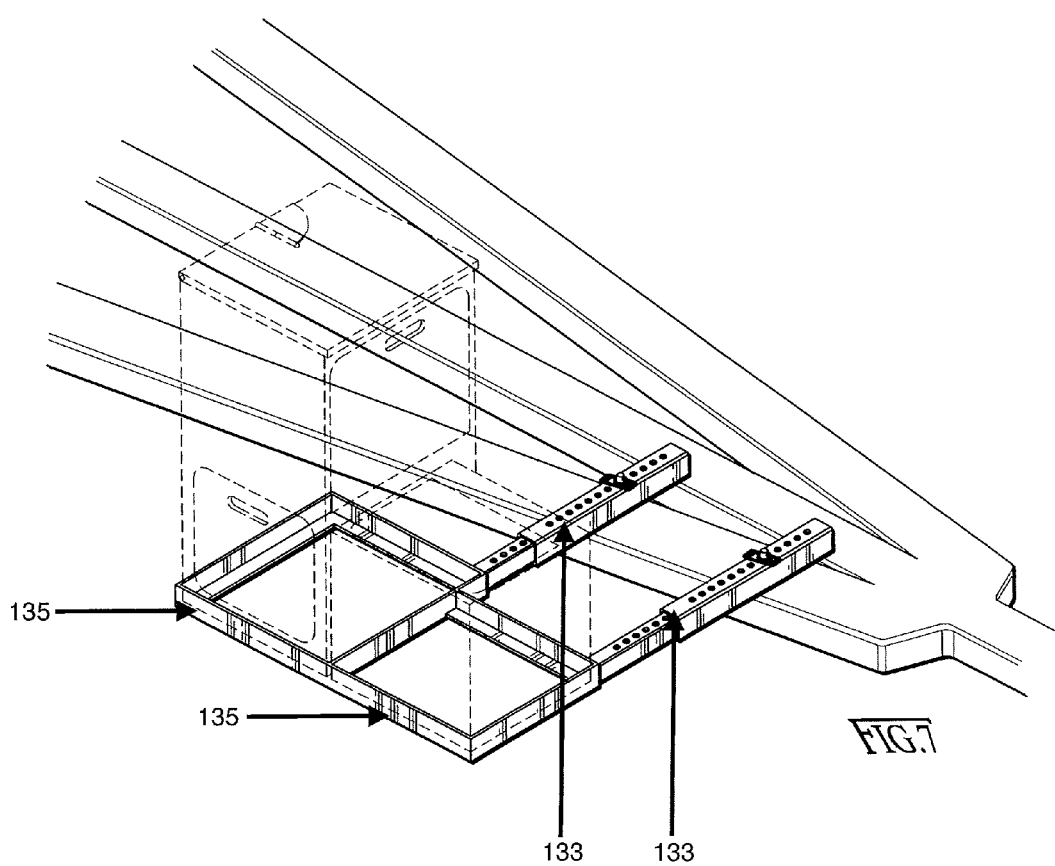

FISH CLEANING STATION

CROSS REFERENCES

None.

GOVERNMENTAL RIGHTS

None.

BACKGROUND OF THE INVENTION

1. Field of the Invention

The present invention relates generally to fish cleaning stations and in particular to a fish cleaning station having storage containers, foldable work trays, and a water supply. The fish cleaning station is designed to be removably mounted to a trailer.

2. State of the Art

There are a number of commercially available portable fish cleaning stations. Some permanently or temporarily attach to trucks, trailers, or to the side of the boat hull. Unfortunately, there are a number of drawbacks to the known devices.

U.S. Pat. No. 3,561,043 discloses a boat-mounted fish cleaning station that includes a rigid trough held over the outside surface of the hull by a horizontal flange that extends over the outer edge of the gunwale. Two flexible cords are attached to the flange that extends over the gunwale to temporarily hold the trough over the outside surface of the hull. Hooks are attached to the end of the cords that engage the lower inside edge of the hull. Because these types of devices are mounted directly to the boat they can scratch or damage the sides of the hull. Second, because the troughs are relatively deep and narrow, they may block or impede the ability to cut through the first with a knife.

U.S. Pat. No. 5,860,367 discloses a portable cleaning table, which is supported by foldable legs. U.S. Pat. No. 5,542,359 discloses a collapsible fish-cleaning table, which has a tabletop member with an upwardly facing work surface, which is supported by collapsible legs attached to the boom of the tabletop member. These types of "stationary" fish cleaning stations cannot easily be transported to and from the fishing site.

U.S. Pat. No. 7,066,096 discloses a game washing and butchering station attached to a trailer. This trailer-mount device lacks storage requiring the fishermen to maintain a separate storage container for supplies that are involved in fish cleaning.

What is needed is an all-in-one portable fish cleaning station having adequate storage and fish cleaning capabilities that can be removably mounted to a variety of trailers. The present invention remedies the above problems and serves a long felt market need.

BRIEF SUMMARY OF THE INVENTION

Disclosed is a fish cleaning station having a support frame with storage space, hinged work trays, electrical outlets and connections, a water supply, and a means for mounting the cleaning station to a trailer or other means.

BRIEF DESCRIPTION OF THE DRAWINGS

FIG. 6 is a top view of the trailer mounting tray.

FIG. 7 is a perspective view of the trailer mounting tray.

LISTING OF COMPONENTS

Figure 1:
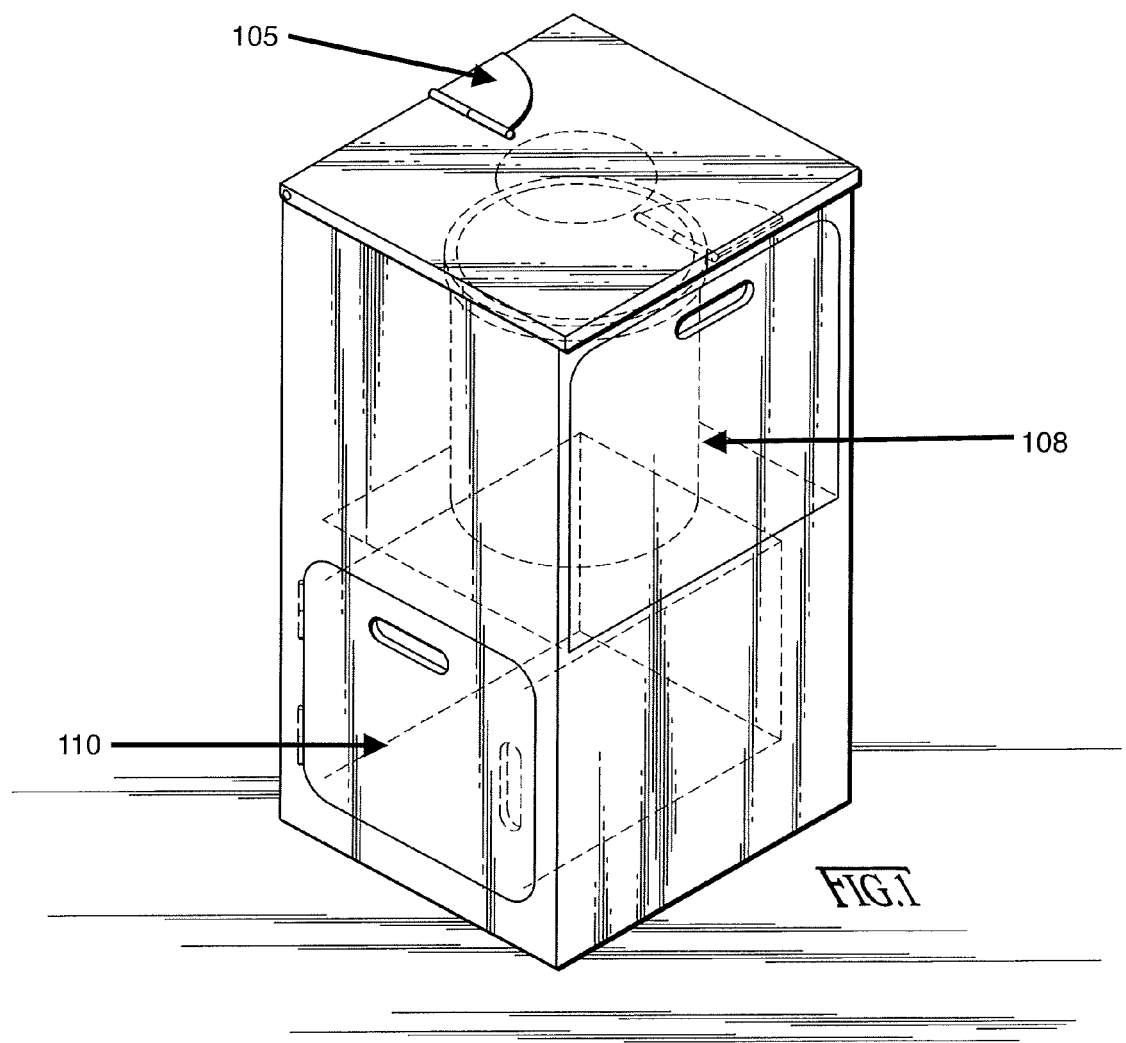
FIG. 1 is a perspective view of the fish cleaning station in a closed position.
Figure 2:
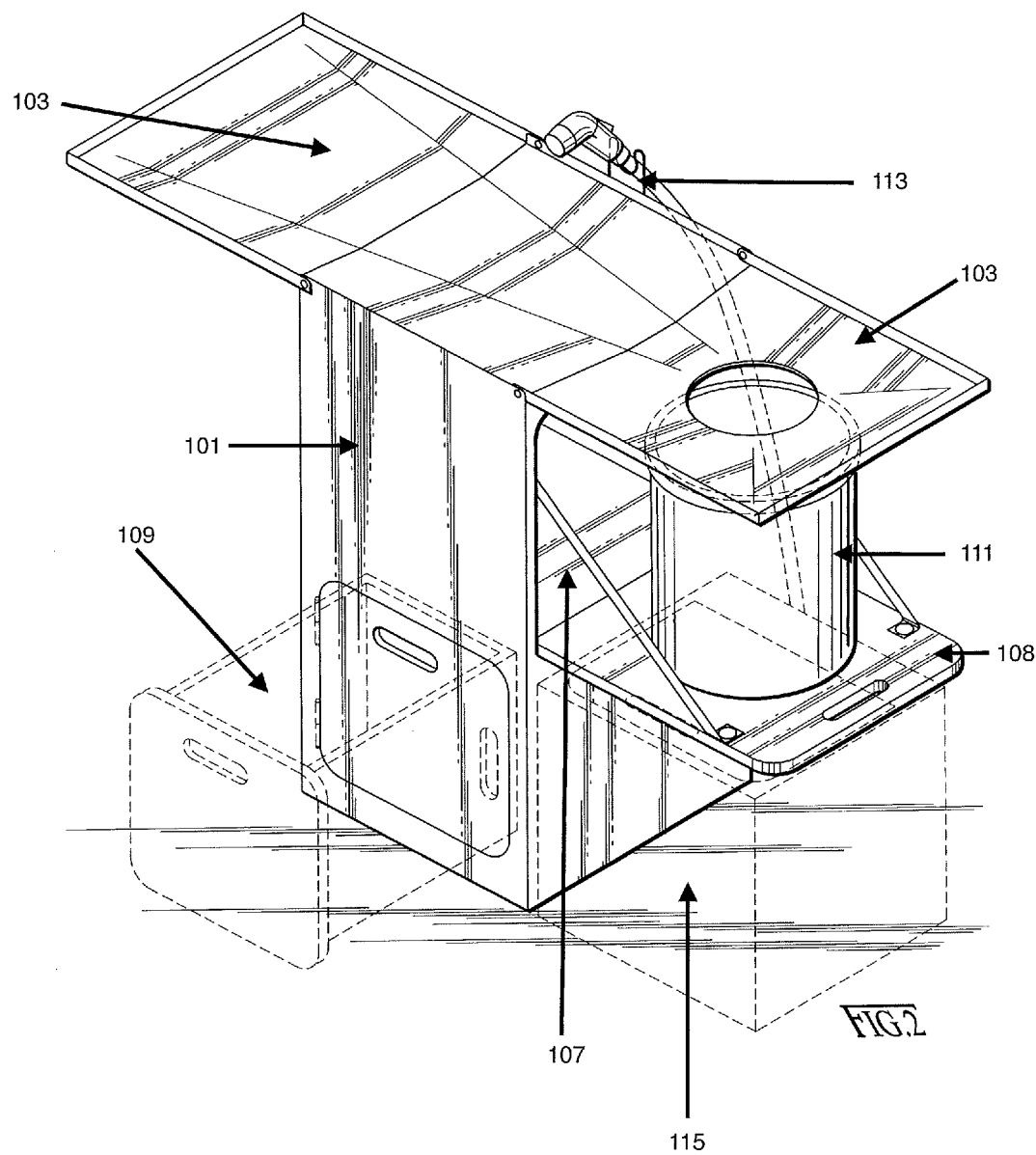
FIG. 2 is a perspective view of the fish cleaning station in an open position.
Figure 3:
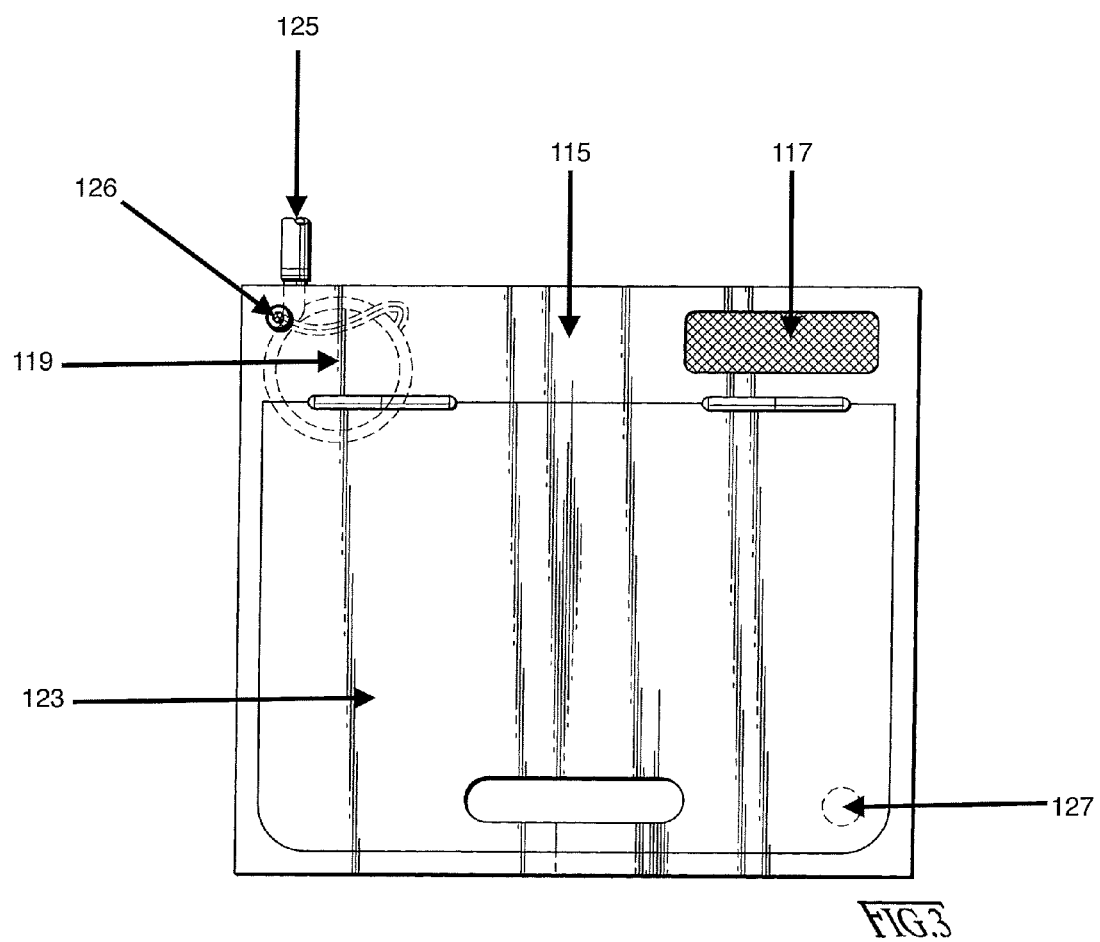
FIG. 3 is a top view of the water storage compartment.
Figure 4:
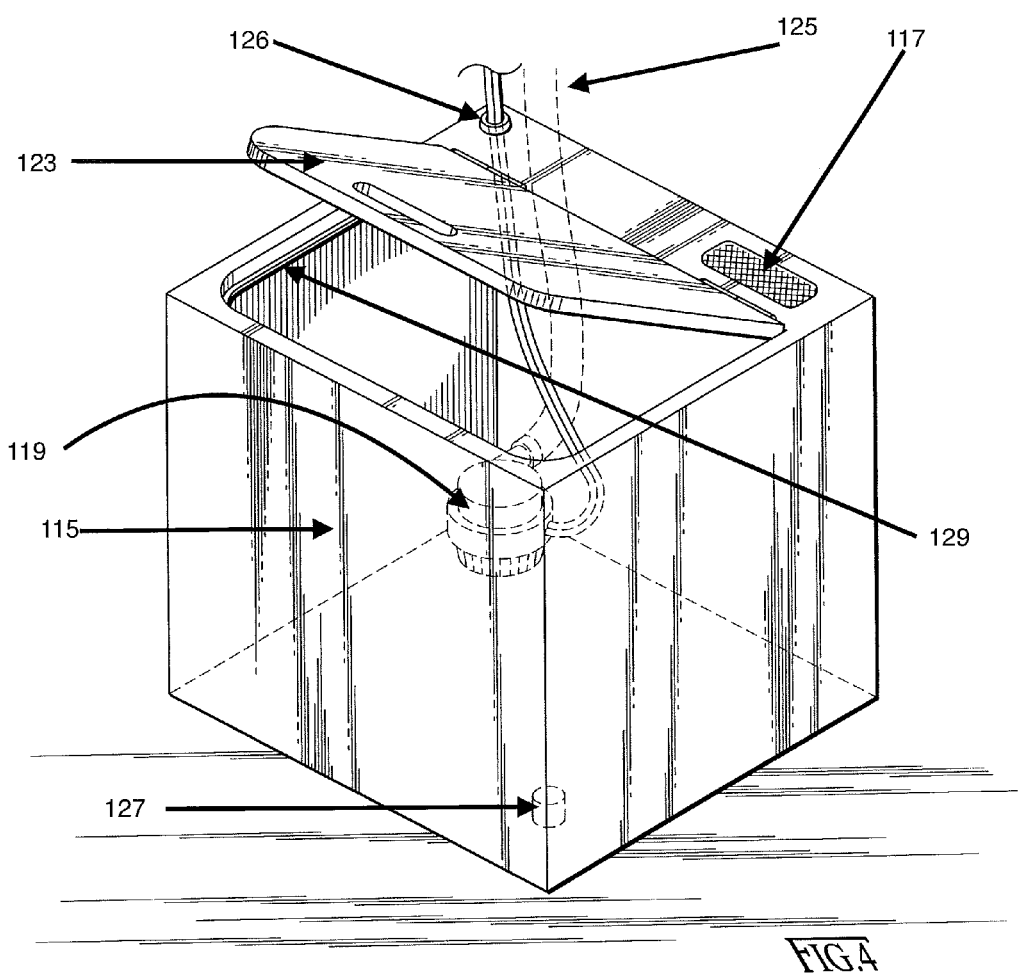
FIG. 4 is a perspective view of the water storage compartment with open lid.
Figure 5:
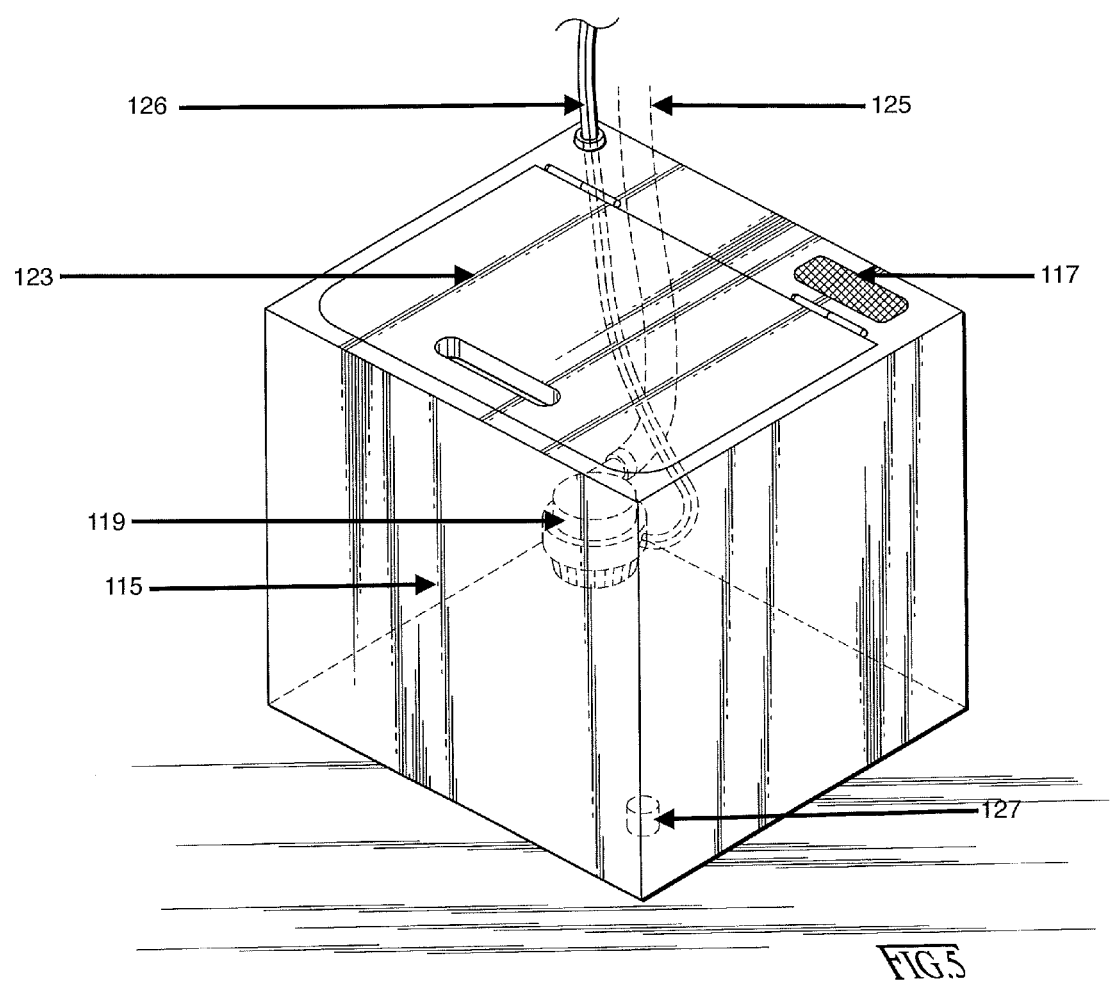
FIG. 5 is a perspective view of the water storage compartment with closed lid.

101—Support Frame
102—Storage Space
103—Tray
105—Brace Plate
107—Upper Storage Compartment
108—Upper Storage Compartment Access Means
109—Lower Storage Compartment
110—Lower Storage Compartment Access Means
111—Waste Receptacle
112—Electrical Outlet
113—Hook
115—Water Storage Compartment
117—Slidable Air Vent
119—Bilge Pump
123—Hinged Lid
125—Water Connection
126—Electrical Connection
127—Drain Plug
129—Rubber Seal
131—Trailer Mounting Tray
133—Trailer Mounting Leg
135—Support Tray

DETAILED DESCRIPTION OF THE INVENTION

The fish cleaning station is comprised of a support frame 101, which defines a storage space 102, an upper storage compartment 107 and a lower storage compartment 109, an at least one tray 103 pivotably mounted to the support frame 101, a water storage compartment 115, and a trailer mounting tray 131 which connects the support frame 101 and water storage compartment 115 to a trailer or other stationary object via an at least one trailer mounting leg 133.

The support frame 101 has a top, a bottom, and at least three sides. The structure of the support frame 101 defines an internal storage space 102, which in one preferred embodiment may contain an upper storage compartment 107 and a lower storage compartment 109. In other preferred embodiments, the upper storage compartment 107 and lower storage compartments 109 may be combined into one single storage compartment. In yet another preferred embodiment, the support frame 101 may have four sides, such that it contains no storage compartments. The support frame 101 may be made of any material of suitable strength.

The upper storage compartment 107 comprises the upper portion of the storage space 102 and may be designed to contain those items necessary and convenient for cleaning fish. In other preferred embodiments it may be designed to contain any number of various sized items. In one preferred embodiment, the upper storage compartment 107 may be accessed via an upper storage compartment access means 108 that in one preferred embodiment may act as a floor or tray on which the waste receptacle 111 may sit. This upper storage compartment access means 110 may open such that it is positioned directly beneath a hole in the pivotably mounted tray 103 through wish waste may pass. In one preferred embodiment the upper storage compartment 107 may be a drawer. In other preferred embodiments the upper storage compartment 107 may be accessed via a hinged door or other accessing means, such that is sufficient to contain the waste receptacle 111. In yet another preferred embodiment, the upper storage compartment 107 may be a recessed cavity, such that it defines a space inside the upper portion of the storage space 102 where various articles may be stored. The upper storage compartment 107 may be made of any material of suitable strength.

The lower storage compartment 109 comprises the lower portion of the storage space 102. The lower storage compartment 109 may be designed to contain any number of various sized items. In one preferred embodiment, the lower storage compartment 109 may be accessed via a lower storage compartment access means 110 that may act as a floor or tray on which the waste receptacle 111 may sit. This lower storage compartment access means 110 may open such that it is positioned directly beneath a hole in the pivotably mounted tray 103 through wish waste may pass. In other preferred embodiments the lower storage compartment 109 may be a drawer. In yet another preferred embodiment, the lower storage compartment 109 may be a recessed cavity, such that it defines a space inside the lower portion of the storage space 102 where various articles may be stored. The lower storage compartment 109 may be made of any material of suitable strength.

The tray 103 may be pivotably attached to the top or side of the support frame 102 via a hinge or other appropriate means. In one preferred embodiment the tray 103 may have lips on three sides to help contain fish waste and water. In another preferred embodiment, the tray 103 may have a hole in it to allow fish waste and used water to fall into a waste receptacle 111. In yet another preferred embodiment, two trays 103 may be pivotably mounted to the top of support frame such that the two trays 103 unfold from opposite sides of the support frame 101 to create a rectangular working surface. In other preferred embodiments, the tray(s) 103 may form a non-rectangular working surface, such that their edges may be rounded.

The hook 113 may be mounted to the top or side of the support frame 101. The primary function of the hook 113 is to hold or support a water nozzle for use in cleaning the fish. In other preferred embodiments, the hook 113 may be mounted in anywhere on the fish cleaning station.

The fish cleaning station may also have an electrical system such that there may be an electrical outlet 112 or other electrical connection 126, by which various tools may be powered. The electric system may be powered via a standard 12 V system such that it may be connected to a standard vehicle or boat battery. Alternatively, the system may be powered via direct connection to other power means such as solar power. The electrical system may be useful for operating many of the items associated with fish cleaning such as lights, electric fish cleaning knives, or electric knife sharpeners.

The fish cleaning station has two operable positions—a first closed position and a second open position. In the first closed position the tray(s) 103 are folded such that they form a singular workspace. In the second open position the tray(s) 103 are unfolded such that they form an elongated rectangular workspace. The user, when desiring increased workspace, moves the tray(s) 103 from the first closed position to the second open position. In other alternative embodiments, the tray(s) 103 may form a non-rectangular workspace.

The water storage compartment 115 may be of any shape or form suitable to hold water. In one preferred embodiment the water storage compartment 115 may be in the shape of a box having a hinged lid 123, which acts as the top of the water storage compartment. In other preferred embodiments the water storage compartment 115 may also include a rubber seal 129, a water connection 125, an electrical connection 126, a bilge pump 119, a slideable air vent 117, and a drain plug 127.

The rubber seal 129 may be used to effectively seal the lid portion of the water storage compartment 115. In one preferred embodiment, the rubber seal 129 may be attached to lid portion of the water storage compartment 115. Alternatively, the rubber seal 129 may be placed on the frame of the water storage compartment 115.

The top or lid of the water storage compartment may contain a slideable air vent 117. The slideable air vent 117 may act as an air intake when water is being pumped from the water storage compartment.

The water storage compartment 115 may contain a bilge pump 119. The bilge pump 119 may be used to pump water to or from the water storage compartment 115 and may be of any type standard to the industry. The bilge pump 119 is powered via wiring inside a basic electrical connection 126. The electrical connection 126 may act as a sealed opening through which wiring may be passed. Alternatively, other pumping means may be used to pump water to and from the water storage compartment 115. If no water is available in the water storage compartment 115, water may be pumped directly from a lake or river or other available water source such as a cooler or an additional water storage means.

Water exits the water storage compartment 115 via a water connection 125. The water connection 125 may act as a sealed opening through which water passes and may be comprised of any material sufficient to hold water, such as a PVC pipe or flexible hose. The drain plug 127 allows the water storage compartment 115 to be drained and cleaned as necessary. The drain plug 127 is preferably placed in any location sufficient to allow draining of the water in the water storage compartment 115.

In one preferred embodiment, the water storage compartment 115 may be a separate unit, may be attached directly to the support frame 101, or may be contained in one of the two storage compartments (107, 109) of the support frame 101.

The trailer mounting tray 131 is comprised of at least one trailer mounting leg 133 and at least one support tray 135, wherein the at least one trailer mounting leg 133 connects the at least one support tray 135 to a boat trailer or other stationary point. In one preferred embodiment the at least one trailer mounting leg 133 may be adjustable. In another preferred embodiment, there may be multiple trailer mounting legs 133. In yet another preferred embodiment the support tray 135 may be comprised of multiple support trays, which may compartmentally hold the support frame 101 and water storage compartment 115. The trailer mounting tray 131 may be comprised of any material of sufficient strength.

I claim:

1. A fish cleaning station attached to a boat trailer, comprising:
   A support frame having a top, a bottom, and at least three sides, wherein the support frame defines a storage space;
   An upper storage compartment inside the storage space of the support frame;

A lower storage compartment inside the storage space of the support frame, wherein the lower storage compartment is beneath the upper storage compartment;

An at least one tray pivotably mounted to the support frame, wherein the at least one tray has at least one hole for waste to pass through;

A hook mounted to the support frame;

A water storage compartment having a top, bottom, and at least four sides wherein the top contains a slideable air vent and at least one side contains at least one water outlet, a drain plug, and an outlet for electrical connection;

A trailer mounting tray comprised of a support tray and at least one adjustable trailer mounting leg, wherein the support tray holds the support frame and water storage compartment and the at least one adjustable trailer mounting leg connects the trailer mounting tray to a frame of boat trailer.

2. The fish cleaning station attached to a boat trailer of claim 1, wherein at least two trays are pivotably mounted to the support frame.

3. The fish cleaning station attached to a boat trailer of claim 1, wherein at least two trays are pivotably mounted to the support frame and at least one tray has at least one hole for waste to pass through.

4. The fish cleaning station attached to a boat trailer of claim 1, wherein the tray is supported by a brace plate connected to the support frame.

* * * * *